United States Patent [19]

Stephan

[11] 4,245,805

[45] Jan. 20, 1981

[54] TURBULENCE COMPENSATED THROTTLE CONTROL SYSTEM FOR AIRCRAFT HAVING THROTTLE COMMAND SIGNAL PATH CONTROL MEANS RESPONSIVE TO ENGINE RATING CONTROL AND FLARE INITIATION

[75] Inventor: Leonard P. Stephan, Seattle, Wash.

[73] Assignee: The Boeing Company, Seattle, Wash.

[21] Appl. No.: 854,567

[22] Filed: Nov. 25, 1977

[51] Int. Cl.² ............................................. G05D 1/12
[52] U.S. Cl. .................................. 244/188; 318/583; 364/440
[58] Field of Search ........................ 60/39.28 R, 243; 244/181, 182, 188, 83 G; 318/580, 583, 584; 364/431, 440, 442

[56] References Cited

U.S. PATENT DOCUMENTS

| 2,664,254 | 12/1953 | Hendrickson | 244/182 X |
| 2,766,953 | 10/1956 | Cummings | 244/182 X |
| 2,933,268 | 4/1960 | Jude et al. | 244/181 |
| 3,758,764 | 9/1973 | Harner | 364/431 |
| 3,840,200 | 10/1974 | Lambregts | 244/182 |

Primary Examiner—Barry L. Kelmachter
Assistant Examiner—Reinhard J. Eisenzopf
Attorney, Agent, or Firm—Conrad O. Gardner; Bernard A. Donahue

[57] ABSTRACT

Command from engine rating control prevents throttle position from exceeding the value at which the engine operates at its rated power. Flare initiation changes the throttle command signal from a closed loop control signal to a fixed number of degrees per second retard rate, thereby overriding an aft limit switch signal allowing throttles to reach the idle position. A servo feedback arrangement utilizes a tachometer signal and an engine PLA (power lever angle) signal to optimize servo performance and overcome undesired control cable characteristics.

3 Claims, 2 Drawing Figures

TURBULENCE COMPENSATED THROTTLE CONTROL SYSTEM FOR AIRCRAFT HAVING THROTTLE COMMAND SIGNAL PATH CONTROL MEANS RESPONSIVE TO ENGINE RATING CONTROL AND FLARE INITIATION

This invention relates to throttle control systems for aircraft and more particularly to throttle control systems including throttle limit control means.

Prior art throttle control systems such as shown in U.S. Pat. No. 3,840,200 to Lambregts, assigned to The Boeing Company, have included forward limit and aft limit switching for throttle position control.

It is an object of this invention to provide means in the throttle command signal path responsive to engine rating control for preventing throttle positioning from exceeding the value at which the engine operates at its rated power.

It is another object of this invention to provide servo feedback control in a throttle control system utilizing tachometer and PLA related signals for optimizing servo performance.

Figure 1:
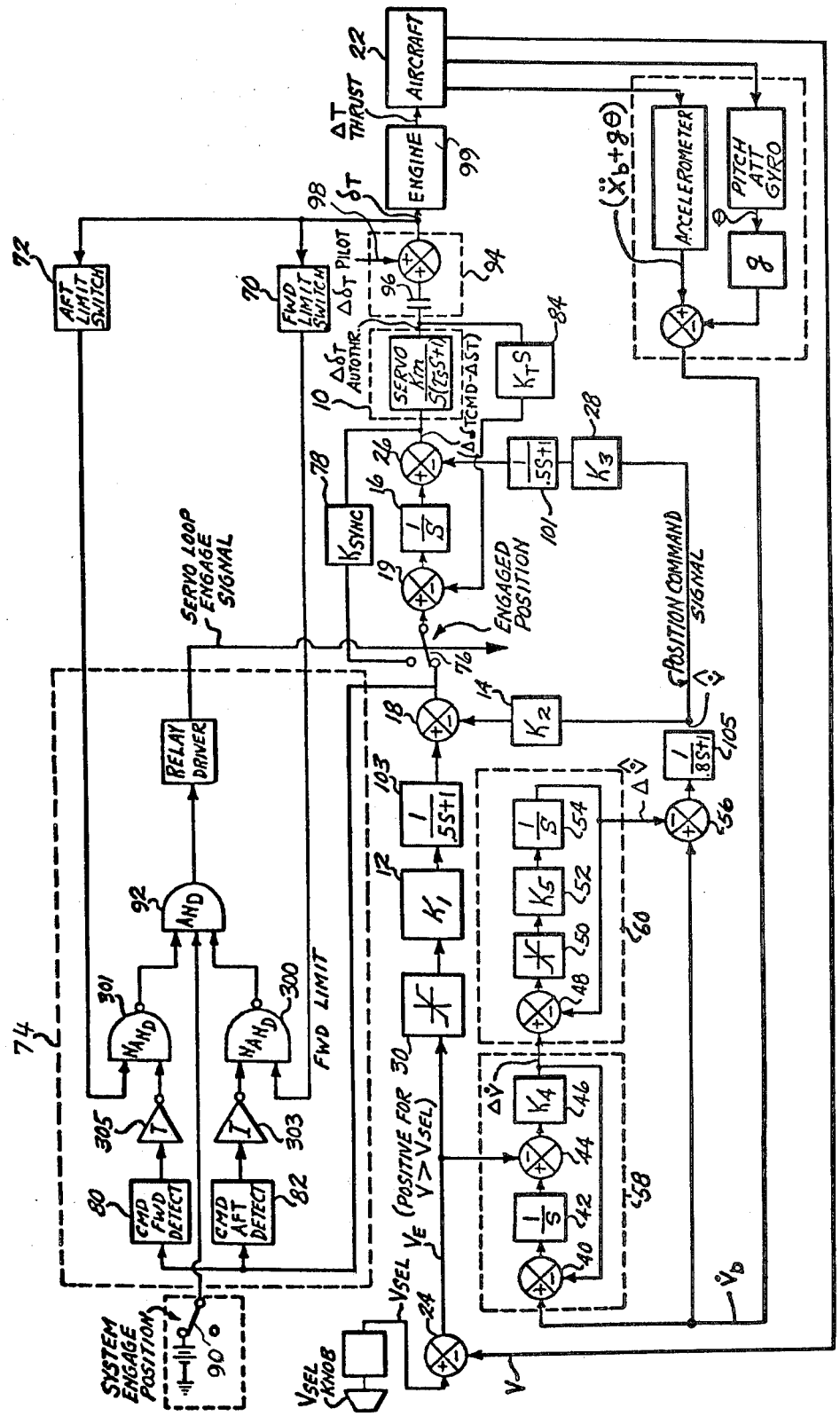
Figure 2:
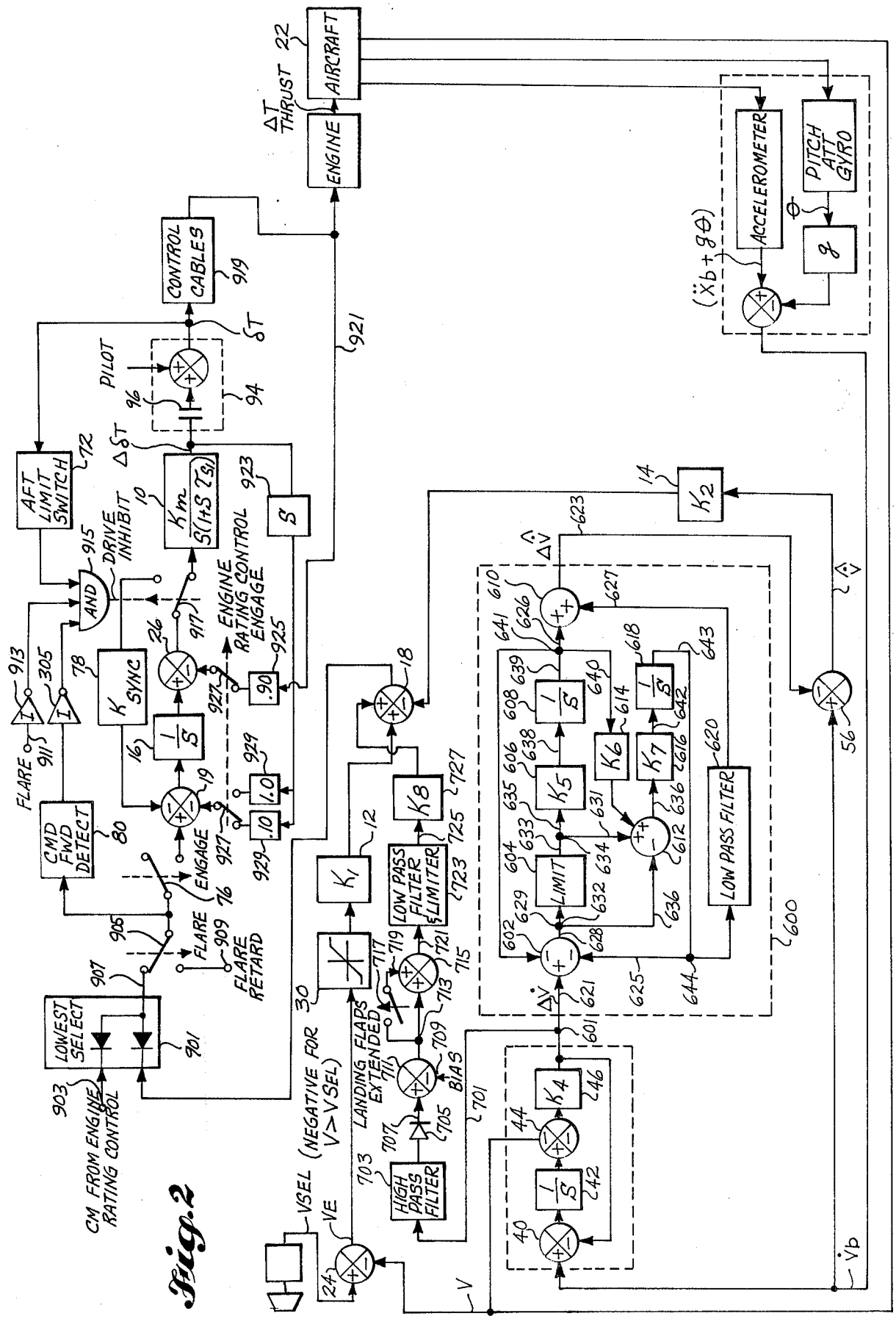

Further objects, features, and advantages of the invention will readily become apparent from the following specification and from the drawings, in which:

FIG. 1 is a schematic diagram of the system shown in FIG. 5 of U.S. Pat. No. 3,840,200 representative of the prior art; and, FIG. 2 is a system circuit embodiment of turbulence compensated throttle control system in accordance with the present invention:

Turning now to FIG. 1 (and FIG. 5 of U.S. Pat. No. 3,840,200 corresponding thereto) denoted PRIOR ART, it will be noted that this complete schematic diagram of prior art throttle control system utilizes a forward limit switch 70 whereas the present system of FIG. 2 utilizes a lowest select circuit 901 which eliminates the need for forward limit switch 70, since engine rating control overrides the speed control. Also, in comparing the prior art system of FIG. 1 with the present system shown in FIG. 2 it can be seen that a feedback network including power lever angle information (PLA) at 921 and tachometer signal $5\Delta\delta_T$ from 923 is utilized to minimize the impact of control cables 919 hysteresis on autothrottle system performance.

In FIG. 1 a rate command type autothrottle system is shown wherein the mode of operation occurring when either the forward or aft throttle limit position is reached should be rated. When either of these two autothrottle conditions is detected by the closing of one of throttle limit switches 70 or 72, autothrottle limit logic circuit 74 generates at the output thereof a servo loop disengage signal causing switching means 76 to close a signal path including synchronizing amplifier 78 from the output of adder 26 back to the input of adder 19, thereby synchronizing the total servo command input to servo means 10 to zero. The autothrottle control systems are reengaged subsequently when the sum $K_1V_E+K_2\dot{V}$ changes sign (polarity from zero). Sign detector circuit 80 or 82 detect the positive or negative polarity change respectively of this sum as provided at the output of adder circuit 18. This circuitry to provide anticipation of throttle command to drive the throttle out of the limit position is therefore proportional to $\dot{V}$, as required to provide capture of the selected speed $V_{SEL}$ asymptotically. The total servo position error, ($\delta T_{CMD}-\Delta\delta T$) is synchronized to zero when switching circuit 76 is in the disengaged position to insure that the servo 10 comes out of the limit position without a step transient. Such a step transient could occur due to the presence of the position command signal proportional to acceleration coupled through amplifier 28 and present as an input to adder 26, if this signal was not zeroed by the synchronization loop. Switching means 76 is driven to the engage position when the output of AND circuit 92 is high, which requires that the system engage switch 90 is engaged and both outputs of circuit 301 and 300 are high.

The output of circuit 300 is normally high except when circuit 70 is high, signifying that the forward throttle limit is reached and circuit 82 is low, further signifying that there is no command to drive the throttles aft, so that in this case both inputs to circuit 300 are high and the output of circuit 300 is low. The output of circuit 301 is normally high except when circuit 27 is high, signifying that the aft throttle limit is reached and circuit 80 is low, further signifying that there is no command to drive forward, so that in this case both input to circuit 301 is high and the output of circuit 301 is low.

The gain value of K sync amplifier 78 determines how fast the position error is nulled out. For a gain factor of 10 the position error goes to zero in less than one second.

The feedback loop for the position servo 10 comprises tachometer means 84 coupled from the output of servo 10 back to an input of adder circuit 19. If the servo motor 10 rotates at a given rate, then the throttle position $\delta_T$ is a ramp function. Mathematically the change in throttle position $\Delta\delta_T$ is the integration of the servo or throttle rate, that is, $\Delta\delta_T=\dot{\delta}_T/S$. The tachometer 84 is actually a generator which produces a signal proportional to the angular velocity of the motor 10 or proportional to the differentiated throttle position, that is $\dot{\delta}_T=S\delta_T$. Throttle position as the feedback signal is obtained using the tachometer signal $K_TS\delta_T=K_T\dot{\delta}_T$, which is then integrated in circuit 16 yielding $K_T/S\dot{\delta}_T=K_T\Delta\delta_T$, thereby providing an output signal proportional to the actual position change $\Delta\delta_T$ utilized to cancel the throttle position command signal $\Delta\delta_T$CMD at adder circuit 26. The servo 10 therefore sees a signal outputted from adder 26 which is proportional to the difference of throttle position command provided in the system of FIG. 1 in accordance with the autothrottle control law and the signal representative of actual throttle position change $\Delta\delta_T$. The throttle servo motor 10 will therefore run with an angular velocity proportional to the position error of the throttle 94 and come to a stop only when true position error has reached zero.

The servo motor 10 drives the throttle means 94 through a clutch means 96 which is normally engaged. The throttle levers indicative of throttle position 98 control the amount of fuel passing to engine 99. When the pilot applies a force to the throttle levers denoted $\Delta\delta_T$pilot, clutch means 96 engages so that the throttle servo 10 no longer drives the levers. This allows the pilot to take over throttle control at any time.

The system of FIG. 2 includes shear detection and compensation circuits 58 and 600 which provide the windshear compensation signal $\Delta\dot{V}$. In shear detection circuit 58 of FIG. 2 it should be noted that the second input to combining circuit 44 comprises a signal representative of airspeed rather than airspeed error, as in the circuit 58 of the system of FIG. 1. In compensation circuit 60 of the system of FIG. 1, limiter circuit 50 rejected signal information exceeding the limits, thereby causing speed wandering in moderate and heavy turbulence, the wandering being directly related to the asymmetry between positive and negative peaks of the signal outside the limits. Compensation circuit 600 in contrast retains signal information over the limit (signal 631 minus signal 636) providing amplification thereof with a gain $K_7$ in amplifier circuit means 616 and subsequent integration in integrator circuit 618 as limited signal 633 is also similarly processed with a gain $K_5$ in amplifier circuit means 606 and subsequently integrated in integrator circuit 608. The path for signal 640 with a low gain $K_6$ through amplifier circuit means 614 to combining circuit means 612 provides equalizing with no dynamic significance. Signal path splitting is thus seen in circuit 600 wherein the signal within the limits of limiter circuit 604 is filtered slightly for rapid system response, whereas the signal path outside the limits provides heavier filtering for noise rejection.

In moderate or heavy turbulence signal 643 is very noisy and is attenuated by low pass filter circuit 620 prior to being added as signal 627 in combining circuit 610 to provide signal 623 representative of $\Delta \overset{\wedge}{V}$.

More specifically, in the turbulence-compensated throttle control system of FIG. 2 shear detection and compensation are provided by washout and lag circuit 58 and compensation circuit 600 where input signal 621 representative of $\Delta \dot{V}$ which is provided at output terminal 601 of washout and lag circuit 58 is coupled to a first input of first combining circuit 602. The output signal 628 at output terminal 632 of combining circuit 602 is coupled through a first signal path 629 to limiter circuit 604 and through a further signal path 636 to a first input of second combining circuit 612. Output signal 633 from limiter circuit 604 is coupled through signal path 631 as a second input to second combining circuit 612 and also through signal path 635 to amplifier circuit 606. The output of amplifier circuit 606 is coupled through signal path 638 to integrator circuit 608, the output path 639 of integrator circuit 608 being coupled through terminal 641 to provide a first input signal 626 to third combining circuit 610. Signal path 640 coupled from terminal 641 through amplifier circuit 614 provides a third input to second combining circuit 612 and the hereinbefore discussed equalizing path in the particular type signal processing provided by circuit 600. Output signal path 636 from second combining circuit 612 is connected in series circuit path through amplifier circuit 616 and integrator circuit 618 to common terminal 644, common terminal 644 being connected to a third terminal of first combining circuit 602 and further connected to low pass filter circuit 620 for providing signal 627 containing useful data information outside the limits of limiter 604 as a second input to third combining circuit 627. Output signal 623 (representative of $\Delta \overset{\wedge}{V}$) from third combining circuit 610 is coupled to an input of combining circuit 56 in the system of FIG. 2 to provide the shear-corrected signal as was the signal $\Delta \overset{\wedge}{V}$ in the system of FIG. 1.

A further feature hereinbefore referred to in the system of FIG. 2 comprises the circuit path coupled between output terminal 601 of washout and lag circuit 58 and an input of adder circuit 18 for providing gust bias signal 729 to increase speed with increasing level of turbulence. The signal $\Delta \dot{V}$ representative of air mass motion with respect to the ground varies rapidly in turbulence and is coupled from output terminal 601 through high pass filter 703 to rectifier 705 so that the high frequency components of the aforesaid signal are rectified and subsequently coupled through combining circuit 711 so that values exceeding bias level 709 are provided at terminal 713 and a first input terminal of combining circuit 715 and appear as input signals 721 to low pass filter and limiter circuit 723 having limits of zero and about ten knots, thereby limiting the amount of "fly fast" command imparted at combining circuit 18 of the throttle control system of FIG. 2. Signal output 725 from low pass filter and limiter circuit 723 is then coupled through amplifier circuit 727 to an input of adder circuit 18. Normally open switching means 717 connected between terminal 713 and circuit path 719 to a second input of combining circuit 715 is closed upon extension of landing flaps in landing configuration of the aircraft, thereby causing a doubling in amplitude of gust bias signal 729 for providing an increased speed margin in the case of turbulence during landing.

As noted earlier the system of FIG. 2 includes lowest select circuit 901 which as hereinbefore mentioned eliminates the need for forward limit switch 70 of the system of FIG. 1, which thereby provides engine rating control override of speed control. In the following description, functional aspects of the system of FIG. 2 common to those of FIG. 1 will be easily recognized, since identical numerals are utilized to identify similar elements in these systems. Proceeding then to the system of FIG. 2 and more particularly to summing amplifier 18 (also shown in the system of FIG. 1) it will be noted that when a positive polarity signal is present at the output of summing amplifier 18, a throttle advance is called for. The utilization of lowest select circuit 901 having a first input diode connected in the throttle command signal path to the output of summing amplifier 18 and a second input diode adapted to receive at second input terminal 903, a signal representative of the difference between engine rating and either EPR or $N_1$ (labeled CMD FROM ENGINE RATING CONTROL) available from the aircraft autothrottle computer guarantees that the throttle position does not exceed the value at which the engine operates at its rated power. It can be seen that the outputs of the two diodes similarly polarized and connected together at output terminal 907 of lowest select circuit 901 allows retarding when a zero valued limit signal is present at terminal 903, not advancement of command, and thus provides smooth override of engine rating. Thus, no more advance command in the throttle command signal path is generated whenever the engine is at rated limit.

Upon flare initiation a signal representative of flare is provided at terminal 911 input to inverter circuit 913, and switch 905 is actuated. AND circuit 915 receives the outputs of inverter circuits 305 and 913 and AFT LIMIT SWITCH 72 providing a drive inhibit signal at the output thereof to close switch 917 to provide a circuit path through synchronizing amplifier 78. It can thus be seen that upon flare initiation the throttle command signal is changed from a closed loop control signal to a fixed number of degrees per second retard rate and the AFT LIMIT SWITCH 72 signal is overridden, thus allowing the throttles to reach the idle position.

As mentioned earlier, a feedback network is provided in the throttle control system of FIG. 2 which minimizes the impact of control cable hysteresis on the system performance. First, as a general consideration it should be noted that control cables 919 which transmit the motion of the cockpit throttle lever to the engine power lever (PLA) exhibit lost motion and friction. A conventional servo feedback scheme tachometer signal ($S\Delta_{\delta T}$) cannot position the engine PLA precisely because of the aforementioned cable control characteristics. Utilization of a PLA signal exclusively will cause the throttles to hunt continuously through the backlash of the control cable in an attempt to position the engine PLA precisely. Such "hunting" or "nervous throttles" is undesirable. As a consequence the present feedback network utilizes a tachometer signal ($S\Delta_{\delta T}$) output and an engine PLA signal wherein the relative signal gains of each signal providing the composite feedback is adjusted to provide optimum servo performance, e.g.:

$S\Delta_{\delta T}$: 10% and

PLA: 90% as indicated in FIG. 2 in the respective feedback paths and provided with switching means 927 in the position shown in FIG. 2. An engine rating control signal (hereinbefore discussed and available from the aircrfat autothrottle computer) representative of engine rating control engage actuates switching means 927 (in the direction of the legendary arrow) to open the PLA feedback path and provide unity gain in the tachometer signal path ($S\Delta_{\delta T}$).

We claim:

1. In combination in an aircraft throttle control system having a throttle command path for an engine: an integrator circuit, a throttle servo motor, throttle means including clutch means, and control cables coupled in series in said throttle command path to said engine; the improvement comprising, a multiple feedback path including first and second feedback paths for minimizing the impact of control cable hysteresis on the performance of said throttle control system including, a first feedback path including tachometer means coupled between said throttle servo motor and said throttle means to said throttle command path upstream from said integrator circuit; and, a second feedback path containing power lever angle information coupled between said control cables and said engine to said throttle command path downstream from said integrator circuit.

2. The invention according to claim 1 wherein said first feedback path includes a signal gain of 0.1 relative to a signal gain of 0.9 provided in said second feedback path.

3. The invention according to claim 1 wherein said multiple feedback path including said first and second feedback paths further includes switching means responsive to signal representative of engine rating control engage for opening the power lever angle feedback path and providing unity gain in the tachometer signal path.

* * * * *